June 12, 1962 L. F. GRIFFITH 3,038,493
PRESSURE REGULATOR VALVE
Filed Oct. 6, 1959
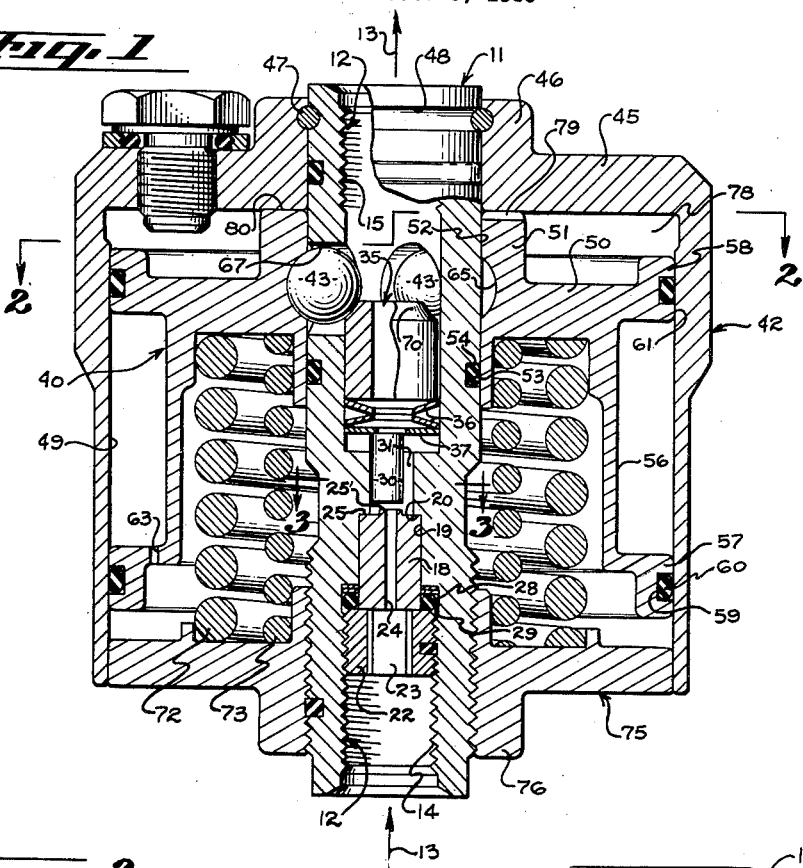
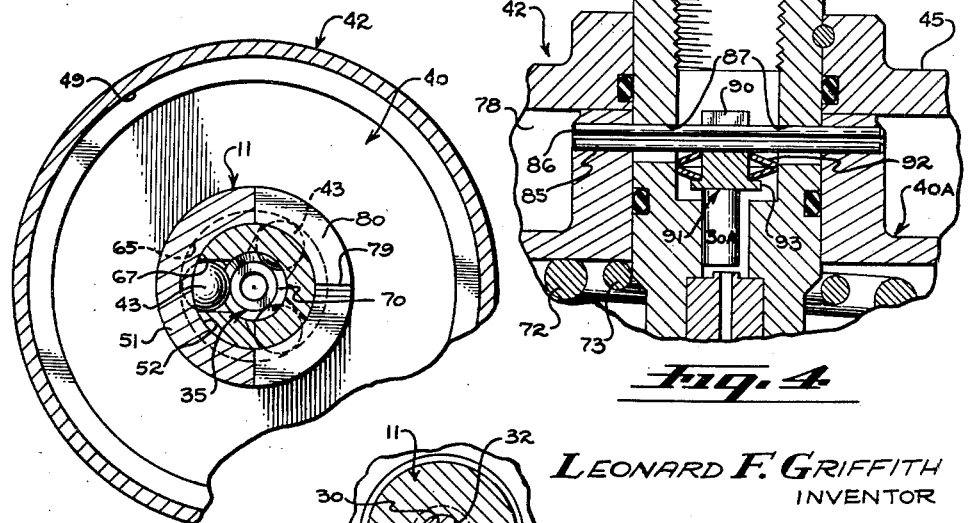
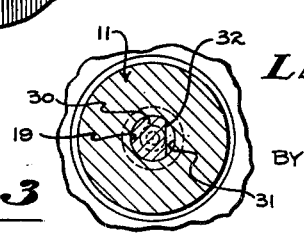
LEONARD F. GRIFFITH
INVENTOR
BY Mason & Graham
ATTORNEYS

United States Patent Office 3,038,493
Patented June 12, 1962

3,038,493
PRESSURE REGULATOR VALVE
Leonard F. Griffith, Glendale, Calif., assignor to Airaterra, Glendale, Calif., a corporation of California
Filed Oct. 6, 1959, Ser. No. 844,829
5 Claims. (Cl. 137—505.25)

This invention relates to pressure regulator valves and particularly to valves of this nature adapted to control high pressure fluids.

An object of the invention is to provide a novel pressure regulator valve embodying a piston adapted to sense pressure or force differential between a spring and a pressured area in a manner to cause a valve body to open and close thus controlling the pressure acting on the sensing piston.

Another object is to provide a pressure regulator valve of the type indicated which is particularly adaptable for handling fluids at relatively high pressures without leakage and which is operable over a wide temperature range.

A further object is to provide a pressure regulator valve of novel construction which is relatively light and may be made small in size and yet obtain high performance efficiency.

A still further object is to provide a novel pressure regulator device of simple construction in which the main parts are coaxial and concentric with metal-to-metal contact between the valve and valve seat.

These and other objects will be apparent from the drawing and the following description. Referring to the drawing, which is for illustrative purposes only:

FIG. 1 is a central sectional elevational view through a device embodying the invention on a scale somewhat larger than required for an actual device;

FIG. 2 is a sectional view on line 2—2 of FIG. 1;

FIG. 3 is a fragmentary sectional view on line 3—3 of FIG. 1; and

FIG. 4 is a fragmentary sectional view through an alternate form of construction.

More particularly describing the invention, numeral 11 generally designates the main valve body which is shown as tubular, being generally cylindrical and having a passage 12 therethrough from end to end. The arrows 13 designate the direction of fluid flow through the device and hence the bore 14, which is threaded for most of its length, may be considered the inlet and the bore 15, which is partially threaded, may be considered the outlet. The valve seat member 18 is provided within a cylindrical interior section 19 of the body 11 in abutment with a shoulder 20, being held in place by a tubular nut 22 which is threaded into the inlet 14 into abutting relation with the outer end of the seat. The nut 22 provides a fluid passage 23 therethrough to a more restricted passage 24 through the valve seat member 18. The latter terminates in an end face 25 which is characterized by a projecting annular seat area 25' which is lapped to optical flatness. A seal ring 28 is provided in an annular space 29 for sealing engagement with the periphery of the valve seat member 18 and the inner surface of body 11.

Beyond the valve seat I provide a valve poppet 30 in a reduced bore 31 of body 11. The poppet is generally cylindrical but provided with a flat side 32 (FIG. 3) to leave space for flow of fluid therepast when it is not seated. The poppet is also somewhat longer than the reduced section 31 of the body and projects into the space defined by bore 15. Beyond the valve I provide a plunger 35, with a pair of conical washers 36 of spring metal and a flat washer 37 interposed between the parts. The plunger and the washers are received for axial movement in the inner end portion of bore 15 and their movement is limited and controlled by a sensing piston 40 in an outer housing 42 through the medium of balls 43 as will appear later.

The outer housing 42 includes an end wall 45 with a hub portion 46 receiving the outlet end of body 11. Two transverse pins 47 in the hub portion, which are partially received in a peripheral groove 48 in the body, serve to retain the parts.

Housing 42 acts as a cylinder for piston 40, having a cylindrical inner surface 49. The piston includes a main wall 50 with a hub 51 having an internal cylindrical surface 52 to slidably receive the body 11. A groove 53 in the body houses a seal ring 54. Piston 40 has an axially extending skirt 56 which terminates in a rim 57. The latter and a rim portion 58 on wall 50, are each provided with a peripheral groove 59 and seal ring 60 in their peripheral surfaces 61. A vent hole 63 is provided in the skirt 56.

As previously indicated, the plunger 35, and hence valve 30, are controlled by the piston through the medium of ball elements 43 which are received in an annular groove 65 in the hub 51 of the piston. The balls are of sufficient diameter to project through the body 11, each ball being received in a slot 67 therein which is of a width approximating the diameter of the associated ball but of a length substantially greater than the diameter of the ball. The balls bear upon a concave upper end surface 70 formed on plunger 35.

The piston is urged toward end wall 45 of housing 42 by two compression coil springs, designated 72 and 73. These are interposed between the main wall 50 of the piston and an end plate 75 which includes a hub portion 76 threaded onto the lower end of the body 11. It will be apparent that the effective force of the springs 72 and 73 against the piston can be regulated by adjustment of the end plate 75.

In order to establish communication between the interior of body 11 and the space 78 inside the housing 42, the hub 51 of the piston is provided with a radial groove 79 in its end surface 80. Thus pressure fluid may escape through slots 67 in the body upwardly along the outside of the body to the groove 79 and into the space 78 to act upon the piston.

The springs 72 and 73 serve to yieldably urge the piston to the position shown which allows poppet 30 to leave its seat 25' under the influence of pressure existing on the inlet side of the valve. The pressure fluid passing through the valve from inlet 14 through sections 23, 24 and 31 passes into the outlet section 15. Some of the pressure fluid may then escape into the annular space 78 to tend to overcome the force of the springs. It will be apparent then that, if the pressure of the fluid in chamber 78 is sufficient to overcome the force of springs 72 and 73, the piston will be forced toward the inlet end of the device carrying with it the balls 43, plunger 35, washers 36 and 37 and valve poppet 30 until the latter closes the passage 24 through the valve seat or practically closes the same to throttle the flow. Some resilience to the operation is provided by the pair of washers 36. With a reduction of pressure in the outlet, and hence in the chamber 78, the springs are effective to again open the valve. Variations in flow from the outlet causes the pressure in chamber 78 to vary thus causing the piston to adjust the valve to greater or lesser flow. This automatic position-seeking causes an essentially constant outlet pressure. The end plate 75 may be adjustably positioned within certain limits to effect the force of the springs and hence adjust the valve for different operating ranges.

A safety or high pressure relief valve is shown provided in the end wall 45 of the housing and this may be of conventional construction to protect the parts and elements connected to the outlet end of the valve from excess inlet pressure in case of valve malfunction as might occur from the presence of dirt, or other cause.

In FIG. 4 I show an alternate form of the invention wherein a pin is used to transmit motion of the piston to the poppet valve. In FIG. 4, parts which are identical to those of the device previously described are designated by corresponding reference numerals while those which are similar but not identical are designated by corresponding reference numerals plus the suffix A.

The piston 40A is fitted with diametrically extending pin 85 which may conveniently be fabricated by rolling a piece of flat stock, thereby leaving a gap 86 as well as a hollow interior therethrough so as to establish communication between the interior of the valve body 11A and the space 78 above the piston. The pin 85 passes through slots 87 in the body 11A and is received in the bifurcated end portion 90 of a plunger 91. Suitable spring washers 92 of the conical type are disposed between the pin and a flange 93 on the plunger. It will be apparent that the operation of the device is the same as that previously described.

Although I have shown and described preferred forms of my invention, I contemplate that various changes and modifications can be made therein without departing from the invention, the scope of which is indicated by the following claims.

I claim:

1. A pressure regulator device, comprising a housing, an open tubular valve body having a valve seat between its ends one end of which constitutes an inlet and the other an outlet and facing said outlet, a free valve member between the valve seat and outlet and adapted to engage said seat, said housing being mounted on and surrounding said valve body and defining therewith an annular chamber, an annular piston in said chamber slidably guided by said valve body, said valve body having a plurality of slots therethrough disposed circumferentially in a region between the valve seat and the outlet with the individual slots extending axially of the body, a movable element in each slot projecting interiorly and exteriorly of the body and movable axially of the body in the slot, said piston having a circumferential groove in its inner surface receiving said movable elements, a plunger in said body between said valve and said movable elements with said elements bearing against the outlet end of said plunger, resilient means between said plunger and said valve member, means establishing communication between the interior of said body on the outlet side of said valve seat and said annular chamber, and means yieldably resisting movement of said piston in response to pressure of fluid in said chamber.

2. A pressure regulator device, comprising a housing, an open tubular valve body providing an inlet at one end and an outlet at the other end with a valve seat therebetween facing the outlet, a free poppet valve in the valve body between the seat and the outlet, said housing defining therewith an annular piston chamber, a piston in said chamber, spring means urging said piston axially toward the outlet end of said body, said piston being slidable on and guided by said body, means establishing communication between the interior of the body on the outlet side of the valve seat and said annular chamber, said body being provided with a plurality of circumferentially spaced axial slots, a movable element in each slot projecting interiorly and exteriorly of the body and being movable axially of the body in the slot, said piston having a circumferential groove receiving said elements, and a free plunger in said body between said elements and said valve, said plunger being designed to permit flow of fluid therepast.

3. A pressure regulator device as set forth in claim 2 in which said movable elements are balls.

4. A pressure regulator device as set forth in claim 2 in which a spring washer means is interposed between said valve and said plunger.

5. A pressure regulator valve as set forth in claim 2 in which said housing has an end wall threadedly mounted for axial adjustment on said valve body and in which said spring means is mounted between said wall and said piston.

References Cited in the file of this patent

UNITED STATES PATENTS

| | | |
|---|---|---|
| 140,006 | Brown | June 17, 1873 |
| 2,213,789 | Wilkins | Sept. 3, 1940 |
| 2,766,631 | Van Sittert | Oct. 16, 1956 |
| 2,888,949 | Evans | June 2, 1959 |

FOREIGN PATENTS

| | | |
|---|---|---|
| 768,317 | France | May 14, 1934 |